C. B. KNOTT.
ROLL FILM CAMERA ATTACHMENT.
APPLICATION FILED FEB. 23, 1916.
1,317,085. Patented Sept. 23, 1919.
2 SHEETS—SHEET 1.
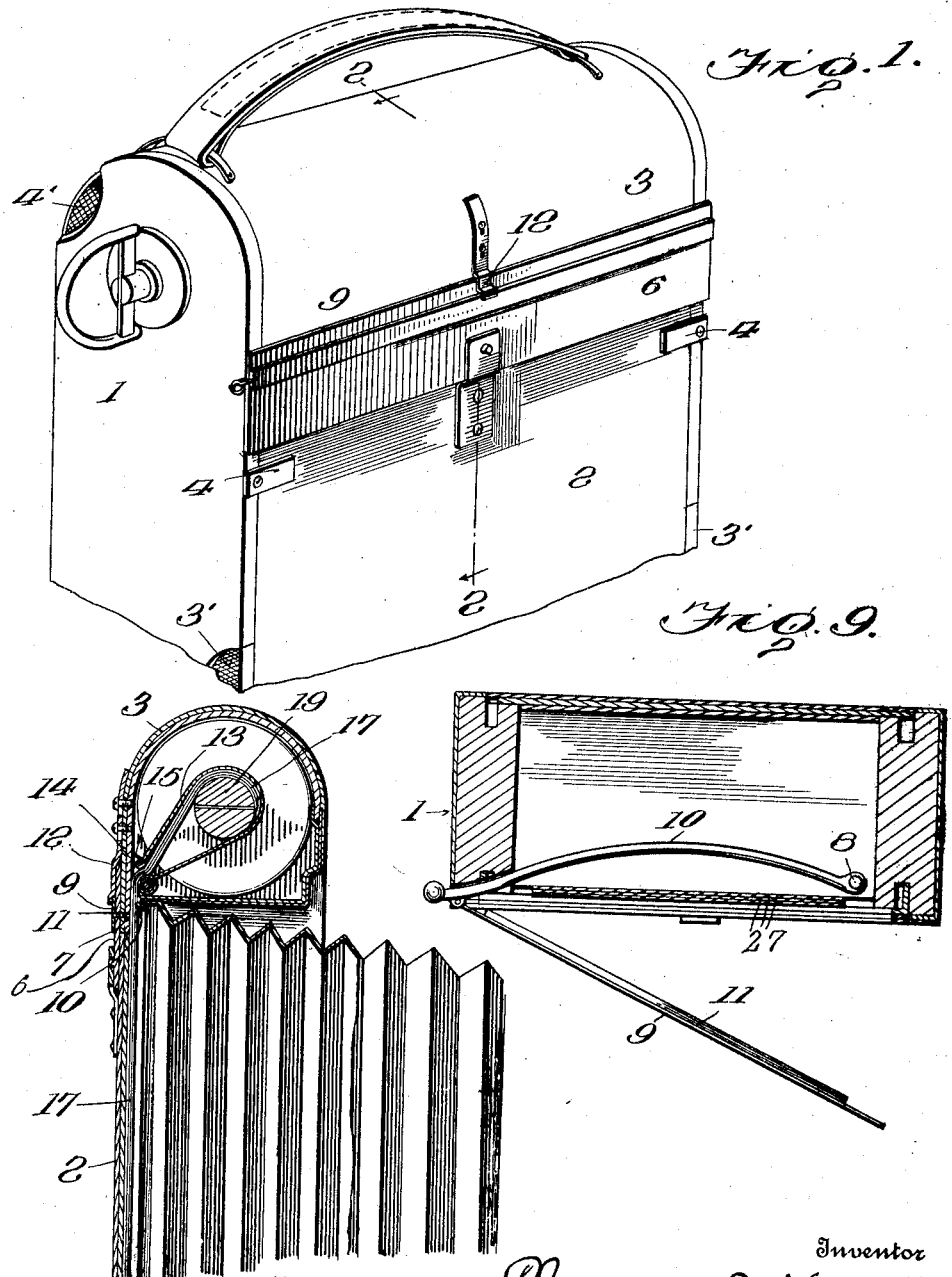

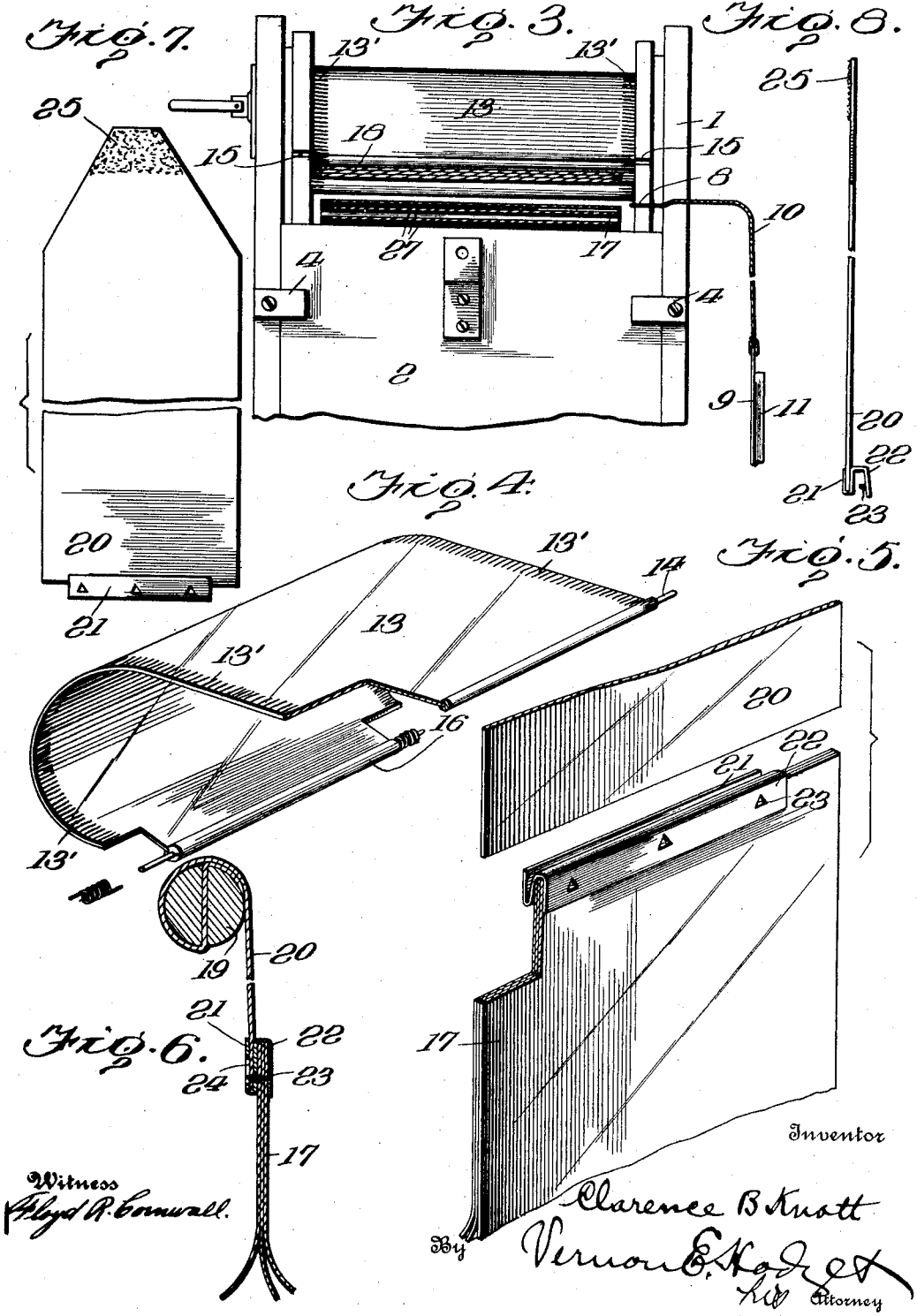

UNITED STATES PATENT OFFICE.

CLARENCE B. KNOTT, OF NEW YORK, N. Y.

ROLL-FILM-CAMERA ATTACHMENT.

1,317,085.　　　　　Specification of Letters Patent.　　Patented Sept. 23, 1919.

Application filed February 23, 1916. Serial No. 79,892.

*To all whom it may concern:*

Be it known that I, CLARENCE B. KNOTT, a citizen of the United States, residing at New York city, in the county of New York and State of New York, have invented certain new and useful Improvements in Roll-Film-Camera Attachments, of which the following is a specification.

My invention relates to improvements in roll film cameras, and appertains more particularly to that type of camera which uses the ordinary commercial roll of six or twelve exposures, but is equally applicable to any number of exposures in a film.

In the present form of camera, no provision is made for developing one or two films out of a roll without developing the entire roll. It is the object of my present invention to provide means for permitting such development without exposing or otherwise injuring the unused films. This feature is a very desirable one from many stand-points, such as, (*a*) Permitting a person to become acquainted with his film by development of one or two exposures at a time;

(*b*) Increasing the efficiency by permitting the development immediately after exposure, thereby permitting one to make another exposure to correct an error in position or time or light, etc., when perhaps a week later conditions would have changed.

With the ordinary type of camera, it may be necessary to wait a week or perhaps even a month or so before the remainder of the film will have been exposed, so that the entire roll can be developed.

For this and many other similar reasons, my present invention has been evolved.

It consists primarily in means for cutting the film at any desired point; in the provision of a light-tight spring-curtain for preventing the unrolling of the film on the spool; and, further, of attachments to be made to the end of the severed portions of the film, whereby to permit of rolling up each portion upon a spool. These attachments supplementarily extend the protecting paper ribbon of the exposed film to properly protect same on the spool or roll, and furnish the unexposed section with a supplementary section of paper ribbon to properly connect it with the substituted spool.

In the accompanying drawings:

Figure 1, is a perspective view of the winding-off-end of the camera;

Fig. 2, is a vertical section on the line 2—2 of Fig. 1;

Fig. 3, is a rear view with the upper portion of the camera removed, disclosing the film as having been severed;

Fig. 4 is a detail perspective view of the light-proof curtain;

Fig. 5 is a detail perspective of the supplementary tab shown as engaging the severed film;

Fig. 6, is a detail section showing the severed film; supplemental tab and the clamping means attached in connection with a receiving reel;

Fig. 7 is a detail elevation of the supplementary tab and clamping means;

Fig. 8, is an edge view of Fig. 7;

Fig. 9, is a horizontal section through the upper portion of the camera showing a modified form of cutting means.

To the camera casing 1 is attached a removable back, which is made of the sections 2 and 3. The section 2 is fastened by the usual snap-catches 3', 3', and I may also provide the pivoted lugs 4, 4. The upper section 3 is provided with fastening clips 4', 4', and with a metallic elongation 6, which forms a light-tight joint with the section 2. This joint is in the proper place so as to not disturb the section of film ready to be exposed. This elongated portion 6 contains in the upper part a light-proof slot 7 extending across and through the back so that the film and paper ribbons may be severed in the proper place to preserve light-tight both the exposed and the unexposed sections of the film.

A knife-point or other sharp instrument may be used through the slot 7 to sever the film and its paper ribbons, but I prefer to use a cord or string 10 or such like device which is attached to one side of the spool-chamber as at 8 and brought across the chamber and passed through a loop or eyelet in the rod 9. As shown in the modified view of Fig. 9, a straight or curved blade 10' may be used which is attached as at 8' to the end of the spool-chamber having its outer free end fastened to the eyelet of rod 9, whereby it is pulled outwardly, thereby acting in a similar manner as the string 10.

It will be apparent that with the film and the paper ribbons stretched as they are between the spools, as usual in a camera, one may by pulling the cord or blade 10 from one end of the slot 7 to the other end, sever all evenly and quickly at one pull.

The rod 9 is provided on the under surface with the longitudinal projection 11 adapted to be received in the slot 7 to render it absolutely light-proof. The rod 9 is kept in position by means of the sliding lock 12.

About the upper spool, which is the one directly actuated manually by the operator, I pass the light-tight curtain 13. This is made of gossamer or plush or velvet or leather, etc., or any combination of those materials. I provide a strip of plush 13' on each edge for an additional safeguard against light. One end of this curtain terminates in a stiff rod 14, which is removably received in the slots 15 in the walls of the spool-chamber. A constant tension is kept on the curtain 13 by a spring-roller 16.

The ratchet on the receiving spool or roll of cameras, and the friction of the runway, together with retarding springs against the feed spool, keep the film tight when the film strip or ribbon is properly installed and the camera in proper operation. Modern films of all makes are so stiff and springy that if the film and paper ribbons are severed they unwind on the roll or spool, like a released coil-spring, making it impossible when so unwound to remove the camera back without "light-striking" or "fogging" more or less of the so unwound sensitive film. The light-proof curtain 13 overcomes this possibility of fogging due to the constant tension which it keeps on the receiving spool 19.

The operation of the invention thus far described is simple. When it is desired to sever the exposed from the unexposed section of a film, the rod 9 is loosened from the light-proof slot 7 and is given a sharp upward pull, causing the knife or string 10 to sever the film and its paper ribbons all the way across, as previously noted. Then the back 3 is removed, exposing the severed ends 27 of the film 17. To the end 18 of the film 17 on the receiving spool 19 is attached one of the supplementary tabs 20. This tab 20 consists of a strip of black paper or other like flexible material, which is provided with the Z-shaped member 21, preferably made of a fairly stiff metal. The paper 20 is received in a fold of the metal 21, as shown in Fig. 8. The upper fold 22 of this strip 21 is provided with downwardly projecting points 23, which are positioned above the punched holes 24 adapted to receive them. This metal strip 21 is adapted to be fastened to the ends of the film and paper ribbons by pushing the projecting points 23 down through the film and paper ribbons and through the holes 24, where they may be turned over and clenched, if necessary.

By this means a grip is obtained upon the film and its attendant paper ribbons, which is not possible if the supplementary tab were merely pasted on, as I believe has been attempted. This is because there are usually three thicknesses of material, and with a tab merely glued, it is impossible to hold the middle ribbon.

Immediately upon the attachment of the strip 20 to the end 18, the receiving spool is actuated in the usual manner, and the spool is wound up, the black tab 20 making the complete roll light-proof. This is rendered much more efficient and certain in its action by the light-tight tension curtain 13. The end of the supplementary tab 20 is provided with the usual mucilaged end 25, whereby to paste the roll to prevent its unwinding.

After the removal of the spool, a spare spool is put in place, and another tab is clamped, in the same manner as the former one, to the end 27 of the film 17. The opposite end 25 of tab 20 is inserted in the new spool, and after taking up the slack on the spool, the film is wound around as in the usual manner.

I claim:

1. In a camera, the combination with a back having a slot, cutting means pivotally mounted beneath the back in close proximity to the slot, and a rod connected to said cutting means and adapted to be inserted in said slot to exclude light.

2. In a camera using a film, the combination with a back having a movable section, and a covering means for the exposed portion of the film, of cutting means extending into the camera adapted to sever the film for the purpose of removing the exposed portion of the film, and a supplementary detachable tab having fastening means adapted to embrace the severed ends of the unexposed portion of the film, whereby the latter may be wound up.

3. In a roll film camera having a movable back section, means within the camera for severing the film while in the camera for the purpose of removing a section thereof, a detachable supplementary tab having means which pierce the layers of the remaining film, the outer free end of said tab adapted to be connected to the winding-up spool, and a flexible light-proof fabric beneath which the severed portion of the film and its supplementary tab is wound.

4. In a roll film camera having a removable back section, means extending in the camera for severing the film while in the camera, whereby a portion thereof may be removed, a tab for the severed ends of the remaining film, and means within the camera for receiving the free end of said tab.

5. A roll film camera having a back consisting of movable and immovable sections, the immovable section having a slot thereacross, means for severing the film and its ribbons while in the camera extending through the slot, detachable supplementary tabs adapted to engage each layer of the film and its ribbons, a spool, a light-tight tension curtain tightened about said spool, between which spool and curtain the severed portion of the film and the supplementary tabs attached thereto are wound.

6. In a roll film camera, an attachment for films comprising a flexible strip with penetrating clamping means at one end thereof, adapted to receive one end of the flexible strip and the layers of the severed film in such a manner that they overlap, the penetrating means passing completely through the overlapped ends of the flexible strip and layers of film and clenched.

In testimony whereof I affix my signature.

CLARENCE B. KNOTT.

Copies of this patent may be obtained for five cents each, by addressing the "Commissioner of Patents, Washington, D. C."